United States Patent
Fan et al.

(10) Patent No.: US 9,807,172 B2
(45) Date of Patent: Oct. 31, 2017

(54) MOBILE DEVICE INTERMEDIARY FOR VEHICLE ADAPTATION

(71) Applicant: AT&T Intellectual Property I, L.P., Atlanta, GA (US)

(72) Inventors: James W. Fan, San Ramon, CA (US); Jennifer K. Lam, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 95 days.

(21) Appl. No.: 14/057,708

(22) Filed: Oct. 18, 2013

(65) Prior Publication Data
US 2015/0112512 A1   Apr. 23, 2015

(51) Int. Cl.
*G05D 1/00* (2006.01)
*G06F 7/00* (2006.01)
(Continued)

(52) U.S. Cl.
CPC ............ *H04L 67/12* (2013.01); *B60G 17/016* (2013.01); *B60G 17/0195* (2013.01);
(Continued)

(58) Field of Classification Search
CPC combination set(s) only.
See application file for complete search history.

(56) References Cited

U.S. PATENT DOCUMENTS 5,513,107 A * 4/1996 Gormley ............ B60G 17/0195
                                                    180/287
5,664,948 A    9/1997 Dimitriadis et al.
(Continued)

FOREIGN PATENT DOCUMENTS

AU    2004202420 A1    6/2004
JP        62128850 A    6/1987
(Continued)

OTHER PUBLICATIONS

Davies, et al., "Automatic Vehicle Identification to Support Driver Information Systems". Vehicle Navigation and Information Systems Conference, 1989. Conference Record. pp. A31-A35, 1989 IEEE. 6 pages.

(Continued)

*Primary Examiner* — Bhavesh V Amin
(74) *Attorney, Agent, or Firm* — Amin, Turocy & Watson, LLP

(57) ABSTRACT

A mobile device intermediary for vehicle adaptation is disclosed. A mobile device intermediary can access driver profile information and vehicle profile information from a remotely located device, determine vehicle adaptation information based on the driver profile information and vehicle profile information, and facilitate access to the vehicle adaptation information to facilitate adapting an aspect of a first vehicle. The mobile device intermediary can further receive other vehicle profile information related to a second vehicle associated with a driver profile and include the other vehicle profile information in determining the vehicle adaptation information. The vehicle adaptation information can be related to adapting a performance aspect of the first vehicle. The vehicle adaptation information can also be related to adapting an amenity aspect of the first vehicle. Vehicle adaption information can provide improved safety and driver comfort as a driver uses different vehicles, can be portable, and can be device independent.

20 Claims, 10 Drawing Sheets

(51) Int. Cl.
| | |
|---|---|
| G05D 3/00 | (2006.01) |
| G06F 17/00 | (2006.01) |
| H04L 29/08 | (2006.01) |
| B60G 17/0195 | (2006.01) |
| B60R 16/037 | (2006.01) |
| H04W 4/00 | (2009.01) |
| B60G 17/016 | (2006.01) |
| B60G 17/02 | (2006.01) |
| B60G 17/06 | (2006.01) |
| B60W 50/00 | (2006.01) |
| H04W 4/04 | (2009.01) |

(52) U.S. Cl.
CPC .............. *B60G 17/02* (2013.01); *B60G 17/06* (2013.01); *B60R 16/037* (2013.01); *H04W 4/001* (2013.01); *B60G 2400/60* (2013.01); *B60G 2600/202* (2013.01); *B60W 50/0098* (2013.01); *B60W 2050/0077* (2013.01); *B60W 2050/0083* (2013.01); *H04W 4/046* (2013.01)

(56) References Cited

U.S. PATENT DOCUMENTS

| | | | |
|---|---|---|---|
| 5,905,247 A | 5/1999 | Ilen | |
| 6,112,152 A | 8/2000 | Tuttle | |
| 6,122,580 A * | 9/2000 | Autermann | B60R 25/2081 701/29.6 |
| 6,198,996 B1 * | 3/2001 | Berstis | B60R 25/2018 701/36 |
| 6,205,374 B1 * | 3/2001 | Kljima | B60G 17/016 307/10.4 |
| 6,225,890 B1 | 5/2001 | Murphy | |
| 6,236,337 B1 | 5/2001 | Beier et al. | |
| 6,240,365 B1 | 5/2001 | Bunn | |
| 6,282,475 B1 * | 8/2001 | Washington | B60R 25/04 296/65.16 |
| 6,282,491 B1 | 8/2001 | Bochmann et al. | |
| 6,330,499 B1 * | 12/2001 | Chou | G07C 5/008 701/31.4 |
| 6,427,115 B1 | 7/2002 | Sekiyama | |
| 6,430,488 B1 * | 8/2002 | Goldman | B60R 25/00 307/10.1 |
| 6,584,381 B2 | 6/2003 | Gehrke | |
| 6,615,123 B2 * | 9/2003 | Morehouse | B60R 16/037 318/567 |
| 6,640,169 B2 | 10/2003 | Bergmann et al. | |
| 6,663,010 B2 * | 12/2003 | Chene | B60H 1/00642 236/51 |
| 6,731,925 B2 * | 5/2004 | Naboulsi | B60R 11/02 340/575 |
| 6,775,603 B2 * | 8/2004 | Yester | B60R 16/037 235/375 |
| 6,823,317 B1 | 11/2004 | Ouimet et al. | |
| 6,882,906 B2 | 4/2005 | Geisler et al. | |
| 6,898,493 B2 * | 5/2005 | Ehrman | G06Q 10/02 701/29.6 |
| 7,072,753 B2 | 7/2006 | Eberle et al. | |
| 7,099,750 B2 | 8/2006 | Miyazawa et al. | |
| 7,289,611 B2 * | 10/2007 | Iggulden | B60R 16/0231 379/102.03 |
| 7,415,339 B2 | 8/2008 | Ikeda et al. | |
| 7,636,045 B2 | 12/2009 | Sugiyama et al. | |
| 7,668,931 B2 | 2/2010 | Parupudi et al. | |
| 7,751,944 B2 | 7/2010 | Parupudi et al. | |
| 7,752,098 B2 | 7/2010 | Matsutani | |
| 7,912,625 B2 | 3/2011 | Cahoon | |
| 8,271,187 B2 | 9/2012 | Taylor et al. | |
| 8,326,259 B2 | 12/2012 | Gautama et al. | |
| 8,352,115 B2 | 1/2013 | Mathieson et al. | |
| 8,370,030 B1 | 2/2013 | Gurin | |
| 8,421,629 B2 | 4/2013 | Carr | |
| 8,463,488 B1 * | 6/2013 | Hart | G07C 5/008 340/576 |
| 8,483,453 B2 | 7/2013 | Yang et al. | |
| 8,509,987 B2 | 8/2013 | Resner | |
| 8,526,925 B2 | 9/2013 | Zellner et al. | |
| 8,819,182 B2 | 8/2014 | Howarter et al. | |
| 8,954,231 B1 | 2/2015 | Song et al. | |
| 2003/0096641 A1 | 5/2003 | Odinak | |
| 2003/0152088 A1 * | 8/2003 | Kominami | B60N 2/0248 370/401 |
| 2004/0110472 A1 * | 6/2004 | Witkowski | G07C 5/008 455/41.2 |
| 2004/0176969 A1 | 9/2004 | Fujinuma | |
| 2006/0155439 A1 | 7/2006 | Slawinski et al. | |
| 2006/0157563 A1 | 7/2006 | Marshall | |
| 2007/0067415 A1 | 3/2007 | Kawaguchi | |
| 2007/0124046 A1 | 5/2007 | Ayoub et al. | |
| 2009/0075630 A1 | 3/2009 | McLean | |
| 2009/0243793 A1 | 10/2009 | Hsu | |
| 2009/0326791 A1 | 12/2009 | Horvitz et al. | |
| 2010/0036560 A1 | 2/2010 | Wright et al. | |
| 2010/0280956 A1 | 11/2010 | Chutorash et al. | |
| 2010/0305807 A1 | 12/2010 | Basir et al. | |
| 2011/0155803 A1 | 6/2011 | Nieuwland et al. | |
| 2011/0246246 A1 | 10/2011 | Johnson | |
| 2011/0257810 A1 | 10/2011 | Leger | |
| 2011/0288891 A1 | 11/2011 | Zaid et al. | |
| 2012/0066419 A1 | 3/2012 | Park et al. | |
| 2012/0095643 A1 | 4/2012 | Bose et al. | |
| 2012/0215375 A1 | 8/2012 | Chang | |
| 2012/0254960 A1 | 10/2012 | Lortz et al. | |
| 2013/0018705 A1 | 1/2013 | Heath et al. | |
| 2013/0046592 A1 | 2/2013 | Ross | |
| 2013/0066688 A1 | 3/2013 | Pinkus | |
| 2013/0073349 A1 | 3/2013 | Kolling | |
| 2013/0090781 A1 | 4/2013 | Gellatly et al. | |
| 2013/0151035 A1 | 6/2013 | Park et al. | |
| 2013/0151063 A1 | 6/2013 | Baughman et al. | |
| 2013/0166106 A1 | 6/2013 | Nakagawa | |
| 2013/0197674 A1 | 8/2013 | Lowry | |
| 2013/0204455 A1 * | 8/2013 | Chia | G07C 5/008 701/1 |
| 2013/0226371 A1 | 8/2013 | Rovik et al. | |
| 2014/0052345 A1 | 2/2014 | Tobin | |
| 2014/0079217 A1 | 3/2014 | Bai et al. | |
| 2014/0091903 A1 | 4/2014 | Birkel et al. | |
| 2014/0128144 A1 | 5/2014 | Bavitz et al. | |
| 2014/0172990 A1 | 6/2014 | Wan et al. | |
| 2014/0187149 A1 | 7/2014 | Lortz et al. | |
| 2014/0310788 A1 | 10/2014 | Ricci | |
| 2014/0379920 A1 | 12/2014 | Nathwani et al. | |
| 2015/0024686 A1 | 1/2015 | Hrabak | |

FOREIGN PATENT DOCUMENTS

| | | |
|---|---|---|
| JP | 2060856 A | 3/1990 |
| JP | 3258633 A | 11/1991 |
| JP | 7232602 A | 9/1995 |
| JP | 2002104105 A | 4/2002 |
| JP | 2009262654 A | 11/2009 |
| JP | 2010163092 A | 7/2010 |
| WO | 2012160298 A1 | 11/2012 |

OTHER PUBLICATIONS

Fruechte, et al., "Integrated Vehicle Control". IEEE 39th Vehicular Technology Conference, 1989, vol. 2, pp. 868-877. 10 pages.

Continental Corporation. "Smartphones are the Key to Car Sharing of the Future", published online at [http://www.continental-corporation.com/www/servlet/pdf/6755794/pr_2012_09_14_nfc_carsharing_en.pdf], Sep. 14, 2012, 2 pages.

Kuemmerling, et al., "Seamless Mobility: Individual Mobility Profiles for a Better Usability of Shared Vehicles." HCI International 2013-Posters Extended Abstracts. Springer Berlin Heidelberg, 2013. 318-322.

Wang, et al., "Real time services for future cloud computing enabled vehicle networks", IEEE International Conference on.Wireless Communications and Signal Processing (WCSP), 2011. 5 pages.

(56) References Cited

OTHER PUBLICATIONS

Barth, et al., "Shared-use vehicle systems: Framework for classifying carsharing, station cars, and combined approaches." Transport Research Record: Journal of the Transportation Research Board 1791.1 (2002): 19 pages.
Office Action dated Feb. 20, 2015 for U.S. Appl. No. 14/075,784, 33 pages.
Notice of Allowance dated Jul. 30, 2015 for U.S. Appl. No. 14/075,784, 57 pages.
Non-Final Office Action dated Feb. 17, 2016 for U.S. Appl. No. 14/927,461, 45 pages.
Final Office Action dated Aug. 16, 2016 for U.S. Appl. No. 14/927,461, 71 pages.
Office Action dated Mar. 15, 2017 for U.S. Appl. No. 14/927,461, 43 pages.
Final Office Action dated Sep. 11, 2017 for U.S. Appl. No. 14/927,461, 55 pages.

* cited by examiner

MOBILE DEVICE INTERMEDIARY FOR VEHICLE ADAPTATION

TECHNICAL FIELD

The disclosed subject matter relates to adaptation of a vehicle related to driver profile information and vehicle profile information.

BACKGROUND

By way of brief background, modern vehicles can include adaptable subsystems. These adaptable subsystems can facilitate adaptation of the vehicle to improve usability of the vehicle. As an example, preset seat adjustments can be stored in a vehicle that can allow one-touch adjustment of the seat, e.g., height, seat angles, lumbar pressure, etc. As another example, adjustable vehicle control pedals can facilitate adjusting the pedal positions to individual drivers.

DETAILED DESCRIPTION

Figure 1:
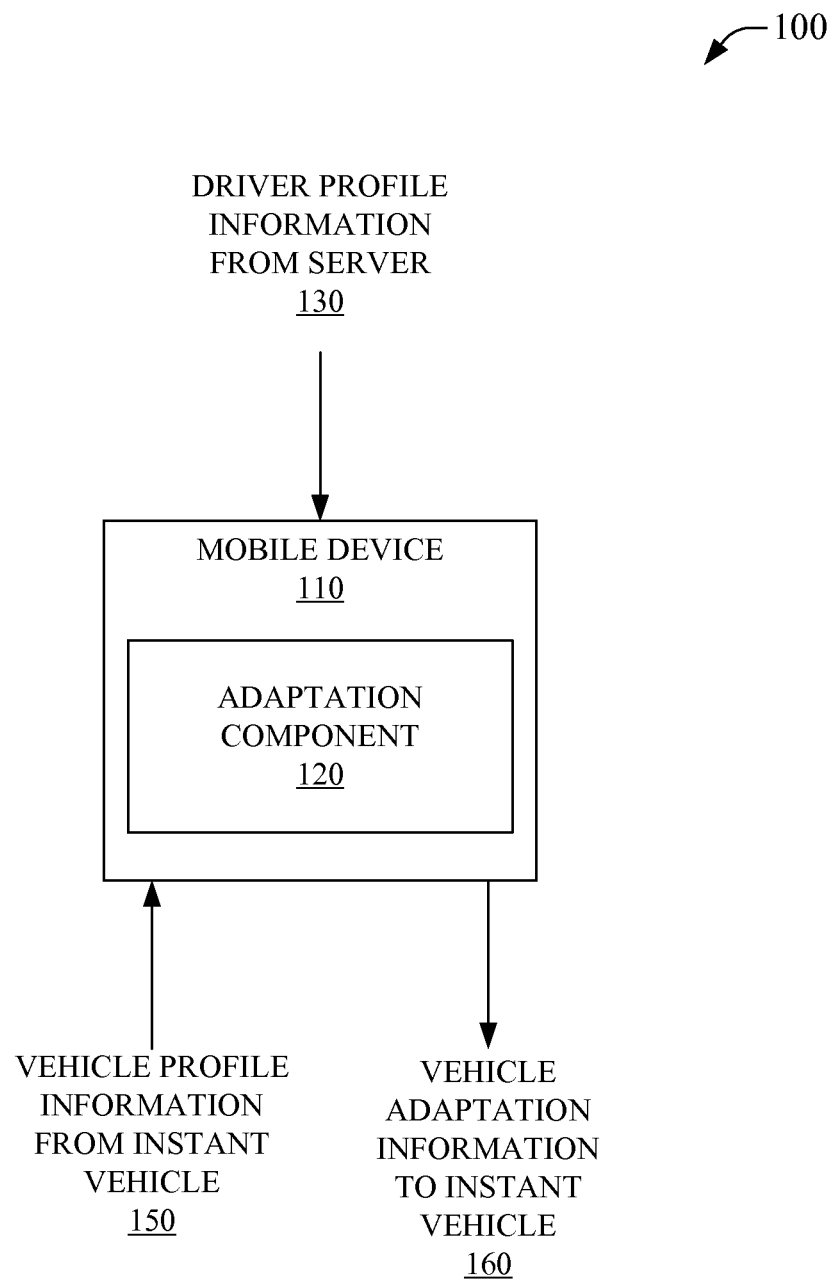
FIG. 1 is an illustration of a system that facilitates employing a mobile device as an intermediary for vehicle adaptation based on a driver profile in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional vehicles can employ many manually adjustable systems, such as, radio stations, seat adjustments, pedal position adjustments, climate control settings, etc. Some newer vehicles have advanced adjustment systems that can store settings for adjustable vehicle subsystems, e.g., storing sets of seat adjustments that can allow the seat to adjust several parameters at the touch of a single button. In some instances, these stored vehicle subsystem adjustments can be activated by items such as computerized keys, key fobs, etc., e.g., when a computerized key is inserted in the ignition, the vehicle can automatically adjust the seat based on settings associated with the particular key inserted in the ignition.

These conventional systems are generally strongly tied to individual vehicles or drivers. As an example, in most conventional systems, a computerized key fob can be associated with a seat adjustment for a first vehicle, however the same key fob would not typically cause seat adjustment in a second vehicle. As such, a driver who has a programmed seat adjustment associated with a key fob for her personal vehicle would not generally be able to rent another vehicle, even of the same make and model, and expect the programmed seat adjustment to work in the rented vehicle based on the presence of the key fob. Similarly, where a driver owns several vehicles, conventional systems would not generally allow adjustment of each vehicle to be effected based on interaction with a single device, e.g., a computerized key fob, a mobile device, a smartphone, etc.

In comparison to conventional systems, a mobile device intermediary (MDI) in accord with the instant specification, such as a cellular phone, a smartphone, a wearable computer, etc., can facilitate access to driver (or passenger) profile information that can be employed to cause adaptation of vehicle subsystems. This can allow a mobile device to cause adaptation of a vehicle based on the driver profile information across vehicles unlike typical systems. As an example, driver profile information can include height, weight, sex, medical information (e.g., epilepsy, sensitivity to light, pacemaker, propensity to thrombosis, etc.), corrective vision information, musical preference information, historical driving pattern or trip information, familial information, driving record information, driving habit information, historic use information (e.g., seatbelt use, radio use, cell phone use, etc.), identifiers for vehicles associated with a driver, or nearly any other type of information associated with a driver. As a further example, a driver can have settings stored for a personal vehicle and these settings can be directly implemented on a rental vehicle of the same make and model unlike conventional systems.

In an aspect, a mobile device intermediary can receive driver profile information stored external to the mobile device. In an embodiment, driver profile information can be stored on a remotely located server. Storage of a driver profile remote from the mobile device can enable the driver profile to be received by other mobile devices that can act as MDIs to enable vehicular adaptation. As an example, a driver can typically use a mobile phone as an MDI to effect vehicular adaptation, however, where the driver forgets their mobile phone at home, a tablet computer can substitute as a MDI by receiving the driver profile from a server allow adaptation of a vehicle with a tablet computer MDI rather than their mobile phone MDI. Further, changes in the vehicle adaptation occurring during use of the tablet computer MDI can be pushed back to the driver profile information on the server such that when the driver again has their mobile phone, the changed vehicle adaptations are employed in adapting their vehicle.

In a further aspect, a vehicle profile can also be employed in adapting a vehicle. A vehicle profile can comprise information specific to a particular vehicle in a manner similar to a driver profile storing information specific to a particular driver. As such, a vehicle profile can comprise vehicle identification information, such as a vehicle identification number (VIN), a license plate number, etc. Further, a vehicle profile can include information such as vehicle make, vehicle model, vehicle service history, vehicle options, odometer information, vehicle geometry information, relevant service bulletin or recall information, historical use information, etc. As an example, vehicle geometry information can include wheelbase, turning radius, length, width, headlight angle, pedal positions, seat positions, legroom information, headroom information, blindspot geometry, etc. As another example, historical use information can comprise fuel economy, lateral acceleration information as a function of speed, braking performance information, acceleration transfer function information, vehicle weight, environmental or weather information, entertainment or radio information, cabin climate selection information, mirror position information, car seat or booster seat usage information, etc. A vehicle profile can be associated with a plurality of driver profiles. This can allow vehicle adaptation to be based on driver profile information and vehicle information. As an example, a driver profile can be related to a driver's sports car and a driver's minivan, such that when the driver rents a minivan on vacation in another city, the MDI can adapt the rental minivan based on driver profile information and the driver's minivan information such that the driver's seat is adjusted to the driver and the passenger airbag is turned off based on a history of using a baby seat in the front passenger seat of the driver's personal minivan at home.

Moreover, adaptation of a vehicle can be transferred between different vehicle makes, models, trim levels, etc. As an example, a user can purchase a new truck and the MDI can adapt the new truck based on the driver profile information and vehicle profile information related to the driver profile. Continuing the example, a driver can be known to be 6'5" tall, statistically an aggressive accelerator, and prefers operatic music, based on the driver profile information. Further, the driver can be associated with a low seat position setting in other vehicles, and frequently carries heavy loads, based on vehicle profile information for other vehicles the driver profile is associated with, such as the other vehicles the driver owns and vehicles the driver has rented in the past. Based on the driver profile information and the vehicle profile information, the MDI can make vehicle adaptation information available to the new truck that sets the seat of the new truck to give adequate headroom and legroom, adapt the angle of the truck headlights to be similar to that experienced by a 6'5" tall driver with seat settings in the other vehicles based on the geometry of the other vehicles with an associated vehicle profile, can select several radio presets associated with classical or opera music, can adjust the suspension to be stiffer in anticipation of a heavy load, and can adapt the accelerator transfer function to mimic the aggressive acceleration of the driver coupled performance information from associated vehicle profile information. This can result in the truck being adapted to perform and feel more like vehicles the driver is familiar with and that better match sight lines, blindspots, headlight ranges, suspension feel, etc., for the new truck with vehicles to which the driver is associated. The driver can then adjust the subsystems of the new truck and these new adjustments can be reflected in updated driver profile information and updated vehicle profile information for the truck.

Furthermore, it will be appreciated that where the driver's wife is associated with the same vehicle profile information as the driver, the combination of the wife's driver profile with the vehicle profile information can result in different vehicle adaptations for the new truck. As an example, where the wife is 5'3", based on the wife's driver profile information, and she rarely carries heavy loads, based on the associated vehicle profile information, the new truck can adapt to a different seat setting and different suspension setting by way of the wife's smartphone MDI as compared to the husband's cellphone MDI.

In an aspect, as future vehicles incorporate more and better sensor and information systems, and where future vehicles include more adaptable subsystems, the portable nature of MDI based adaptation of vehicles can be expected to improve driver and passenger experience. As an example, a future vehicle can have electronically tinted windows and a driver MDI can adapt sections of the vehicle windows to be at a first level of tinting associated with the geometry of the vehicle and the driver's computed sightlines and preferences, while other sections of the windows are tinted at a second level of tint based on a passenger MDI associated with the passenger height and preferences.

In a still further aspect, because the driver profile information and vehicle information can be treated separately, privacy concerns can be addressed. Vehicle profile information can be divorced from identification of a particular driver, while driver profile information can still be associated with a vehicle profile thereby limiting access to vehicular information that may not be related to a specific driver. As an example, if a driver sells a car, the car profile information can include historical information about the car that typically would not identify the seller. Further, MDI adaptation of vehicles for the original owner can still consider the historical use of the sold vehicle. Moreover, MDI adaptation of the sold vehicle for the new owner can consider the history of the sold vehicle and the new history generated since the sale of the vehicle as well.

In an embodiment, MDI for vehicle adaptation can include a mobile device comprising a memory and processor to perform operations. The operations can include receiving driver profile information representing a driver profile that is associated with the mobile device. Further, the operations can provide for receiving vehicle profile information related to a first vehicle. Moreover, the mobile device can, based on the driver profile information and the vehicle profile information, determine vehicle adaptation information related to adapting an aspect of the first vehicle. The operations can further facilitate access to the vehicle adaptation information for a device of the first vehicle to enable adaptation of the aspect of the first vehicle.

In another embodiment, MDI for vehicle adaptation can comprise a method including receiving, by a mobile device comprising a processor, driver profile information associated with the mobile device from a device located remotely from the mobile device. The method can further provide for receiving vehicle profile information related to a first vehicle. The method can then determine vehicle adaptation information related to adapting an aspect of the first vehicle and based on the driver profile information and the vehicle profile information, and facilitating access to the vehicle adaptation information for a device of the first vehicle to initiate adaptation of the aspect of the first vehicle.

Moreover, in another embodiment, MDI for vehicle adaptation can include a server device, including a memory and processor, that can receive driver profile information associated with a driver profile that is associated with a mobile device, receive vehicle profile information related to a first vehicle via the mobile device, and receive other vehicle profile information related to a second vehicle associated with the driver profile. The server device can further determine, based on the driver profile information, the other vehicle profile information, and the vehicle profile information, vehicle adaptation information related to adapting an aspect of the first vehicle. The server device can also enable access, via the mobile device, to the vehicle adaptation information for a device of the first vehicle to facilitate adaptation of the aspect of the first vehicle.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates employing a mobile device as an intermediary for vehicle adaptation based on a driver profile in accordance with aspects of the subject disclosure. System 100 can include mobile device 110. Mobile device 110 can be a smartphone, tablet computer, laptop computer, or any other type of mobile device.

Mobile device 110 can comprise adaptation component 120. Adaptation component 120 can determine vehicle adaptation information related to adapting a subsystem of a vehicle. Nearly any vehicle subsystem can include adaptive features, e.g., a vehicle engine can comprise an acceleration transfer function that determines vehicular acceleration in response to actuation of a gas pedal, a vehicle suspension system can be adjustable, the projection angel of a vehicle's headlights can be adjusted, seat positions or lumbar support can be adjustable, radio stations can be updateable, power mirrors can be adjusted automatically, climate control systems can be programmable, tire inflation can be adjustable, etc. In an aspect, nearly any vehicle subsystem can be subject to adaptation or control. This adaptation and control can be effected by a control device, e.g., a dedicated controller device, a central vehicle computer system, etc.

Adaptation component 120 can be coupled to a vehicle subsystem control device to facilitate adaptation of a vehicle subsystem. Coupling between mobile device 110 and a vehicle subsystem control device can be via a wired or wireless interface, e.g., a cable, Bluetooth-type coupling, Zigbee-type coupling, etc. As such, where adaptation component 120 of mobile device 110 determines vehicle adaptation information, this information can be made available to a vehicle, e.g., vehicle adaptation information to instant vehicle 160 to facilitate adaptation of a vehicle subsystem.

Mobile device 110 can receive driver profile information from a server 130. Driver profile information can include nearly any type of information associated with a driver. The term driver can refer to a vehicle operator or a passenger in a vehicle and is intended to be an inclusive, rather than an exclusive, term unless otherwise explicitly or inherently indicated, e.g., driver profile information can also be passenger profile information. As such, the term driver profile information is employed for clarity inasmuch as many vehicle subsystems are preferentially adaptable for a driver before a passenger, however, where a vehicle subsystem is adaptable for a passenger, passenger profile information is considered within the scope of the subject disclosure.

Mobile device 110 can also receive vehicle profile information from an instant vehicle 150. An instant vehicle can be a vehicle operated or occupied by a driver or passenger. As such, when a driver gets in an instant vehicle with mobile device 110, mobile device 110 can receive both driver profile information from server 130 and vehicle profile information from instant vehicle 150. In an aspect, driver profile information 130 and vehicle information 150 can be separate and distinct sets of information. This can facilitate driver privacy when vehicle profile information is accessed by separating driver information from vehicle information. Vehicle profile can comprise information specific to a particular vehicle in a manner similar to a driver profile storing information specific to a particular driver.

Adaptation component 120 of mobile device 110 can determine vehicle adaptation information to instant vehicle 160 based on driver profile information from server 130 and vehicle profile information from instant vehicle 150. As an example, where a driver is associated with driver profile information including an indication of frequent driving late at night, and vehicle profile information for an instant vehicle indicates the vehicle has a driver eye movement monitoring system, adaptation component 120 can determine vehicle adaptation information related to increasing the sensitivity of the vehicle eye movement monitoring system to cause earlier alerting of the driver when eye movement indicates that the driver may be drowsy. As a further example, where driver profile information 130 indicates that a driver has a sensitivity to bright lights, such as from cataract surgery, and vehicle profile information from the instant vehicle 150 includes indicia of an autochromic rear-view mirror, the darkening response for the rear-view mirror can be adapted to darken more quickly in response to incident light to reduce the effect of bright light reflecting into the driver's eyes. Similarly, where driver profile information 130 does not indicate a sensitivity to light, the autochromic response can be adjusted to a default response because the driver is less likely to be distracted by headlights in the rear-view mirror. As a further example, where a driver has poor circulation and is more susceptible to thrombosis in the legs, vehicle seats can be adapted to adjust pressure on the legs more frequently than for a driver with normal circulation. Numerous other examples of determining vehicle adaptation information to instant vehicle 160 based on driver profile information from server 130 and vehicle profile information from instant vehicle 150 can be, but are not, recited for the sake of clarity and brevity, although all such examples are considered within the scope of the subject disclosure.

Figure 2:
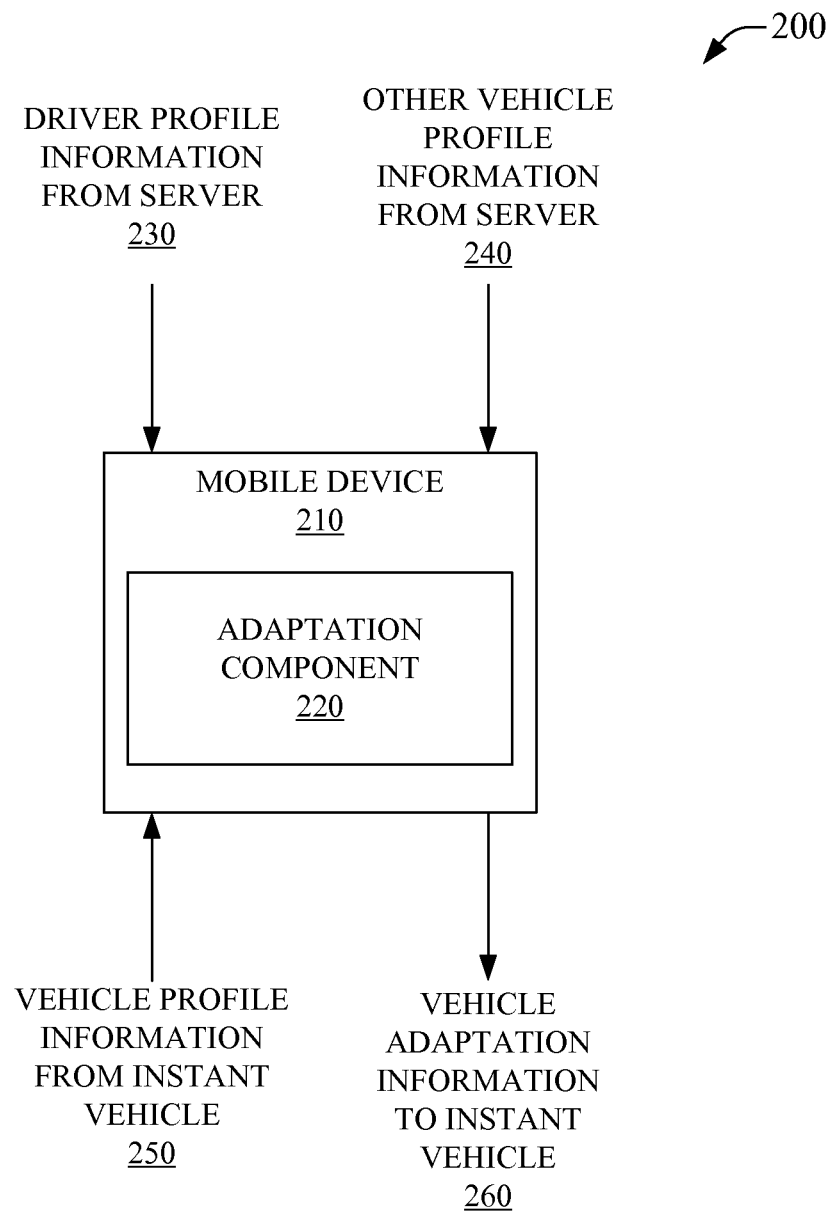
FIG. 2 is a depiction of a system that facilitates employing a mobile device as an intermediary for vehicle adaptation based on a driver profile and other vehicle profile information in accordance with aspects of the subject disclosure.

FIG. 2 is a depiction of a system 200 that can facilitate employing a mobile device as an intermediary for vehicle adaptation based on a driver profile and other vehicle profile information in accordance with aspects of the subject disclosure. System 200 can include mobile device 210. Mobile device 210 can comprise adaptation component 220. Adap tation component 220 can determine vehicle adaptation information related to adapting a subsystem of a vehicle. Nearly any vehicle subsystem can include adaptive feature. In an aspect, nearly any vehicle subsystem can be subject to adaptation or control based on vehicle adaptation information, e.g., vehicle adaptation information to instant vehicle 260. This adaptation and control can be effected by a control device of the vehicle. Adaptation component 220 can be coupled to a vehicle subsystem control device (not illustrated) to facilitate adaptation of a vehicle subsystem. Coupling between mobile device 210 and a vehicle subsystem control device can be via a wired or wireless interface. As such, where adaptation component 220 of mobile device 210 determines vehicle adaptation information, this information can be made available to a vehicle, e.g., vehicle adaptation information to instant vehicle 260, to facilitate adaptation of a vehicle subsystem.

Mobile device 210 can receive driver profile information from server 230. Driver profile information can include nearly any type of information associated with a driver. Mobile device 210 can also receive vehicle profile information from instant vehicle 250. An instant vehicle can be a vehicle operated or occupied by a driver or passenger. As such, when a driver gets in an instant vehicle with mobile device 210, mobile device 210 can receive both driver profile information from server 230 and vehicle profile information from instant vehicle 250. In an aspect, driver profile information 230 and vehicle information 250 can be separate and distinct sets of information. Vehicle profile can comprise information specific to a particular vehicle in a manner similar to a driver profile storing information specific to a particular driver.

Mobile device 210 can further receive other vehicle profile information from server 240. Other vehicle profile information from server 240 can be similar to vehicle profile information for the instant vehicle but will typically be for other vehicles associated with the driver profile information from server 230. As an example, driver profile information from server 230 can comprise an identifier related to a vehicle other than the instant vehicle that is associated with the driver related to driver profile information from server 230. The identifier can be used to receive vehicle profile information from server 240 related to the identifier. This information can then be included in determining vehicle adaptation information to instant vehicle 260.

Adaptation component 220 of mobile device 210 can determine vehicle adaptation information to instant vehicle 260 based on driver profile information from server 230, other vehicle profile information from server 240, and vehicle profile information from instant vehicle 250. As an example, a driver can be associated with driver profile information indicating nerve damage related to decreased hand-eye coordination that can result in "shaky hands". These "shaky hands" can cause a car with a sensitive steering system to pull slightly left and slightly right while driving in a straight line because the driver may not hold the steering wheel perfectly straight as a result of the nerve damage. This can give an appearance of wandering within a lane. Continuing the example, vehicle profile information for an instant vehicle can indicate that the vehicle has an adaptive steering system that can correct for "shaky hands" by adjusting dampening of the steering input from the steering wheel. As such, adaptation component 220 can receive other vehicle profile information from server 240 indicating a damping level for steering in other vehicles associated with the driver. The other vehicle profile information from server 240 can be mapped to the adaptive steering system of the instant vehicle based on vehicle profile information from instant vehicle 250. This mapping can compensate for differences between the steering systems of the other vehicles and the steering system of the instant vehicle such that resulting vehicle adaptation information to instant vehicle 260 can provide a similar steering response for the drivers steering input as the other vehicles even where the adaptable steering of the instant vehicle may not be the same as those of the other vehicles.

Similarly, as another example, the steering response of other vehicles associated with a driver can be included in determining vehicle adaptation information for steering in a new vehicle the driver is using, e.g., where the driver usually drives an dump truck with low response steering, and the driver hops in a sports car with highly responsive steering, the steering of the sports can be adapted to be less responsive until the driver updates the steering to be more responsive. This can allow the driver to more easily transition to the sports car where the driver is used to driving a dump truck and, as the driver becomes more familiar with the sports car, the steering can be made more responsive. Further, as the driver makes the steering more responsive, the driver profile or vehicle profile can be updated to reflect the drives increased abilities with highly responsive steering. In an aspect, this type of vehicle adaptive information can provide for improved safety and driver comfort as a driver changes vehicles, for example, by renting cars on vacation, changing vehicles frequently for work, driving a friend's car, etc. Moreover, because the adaptation is facilitated by mobile device 210 as a MDI, the adaptation is portable and can be employed on two vehicles of the same make/model, same make but different model, different makes, or even different classes of vehicles. Further, where the driver profile information, e.g., 230, and the other vehicle profile information, e.g., 240, are received from a server by mobile device 210, the adaptation is also device independent, e.g., where a driver forgets their mobile phone, the adaptation can be effected by a tablet computer mobile device, etc.

Figure 3:
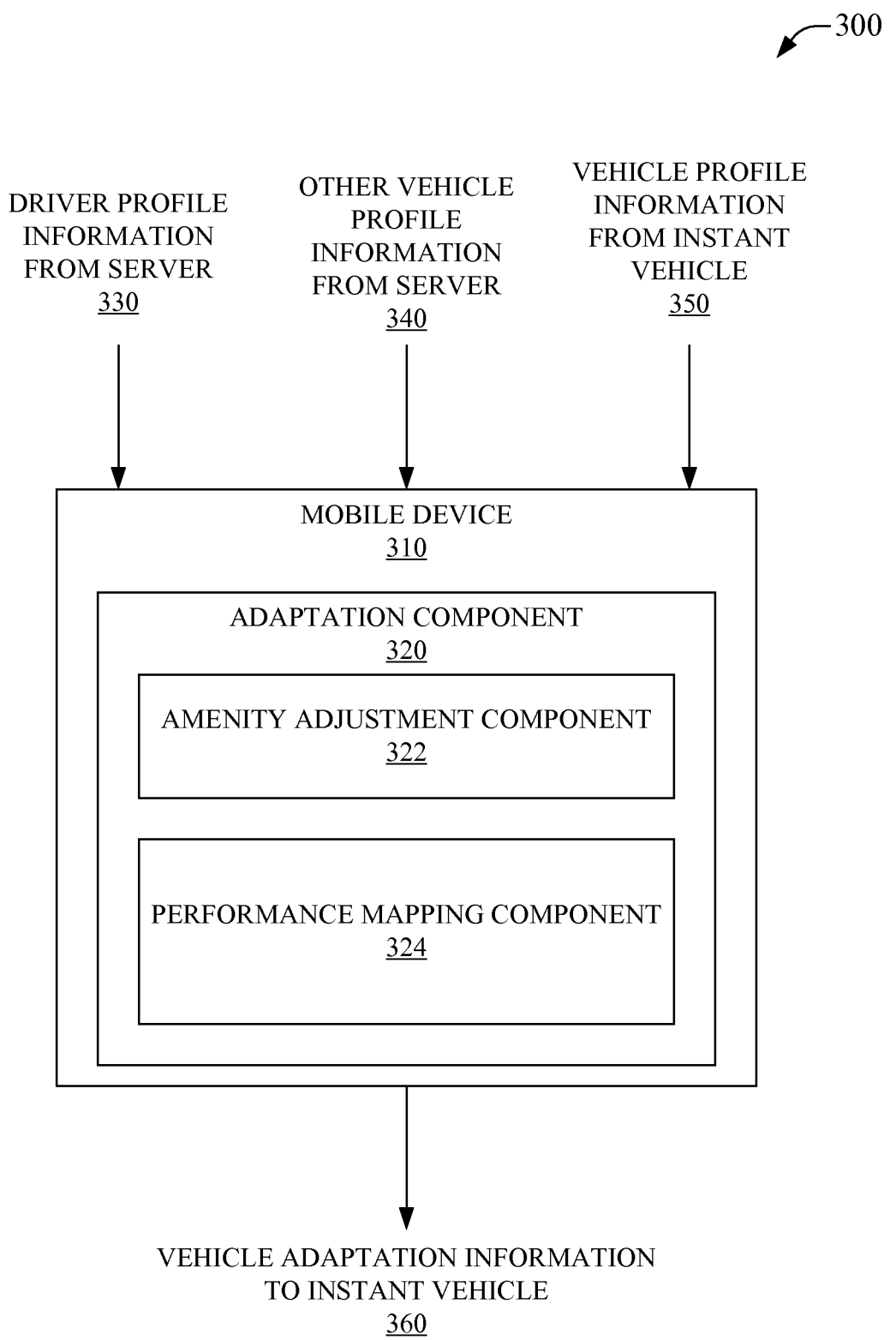
FIG. 3 illustrates a system that facilitates employing a mobile device as an intermediary for adaptation of a vehicle amenity and/or vehicle performance based on a driver profile and other vehicle profile information in accordance with aspects of the subject disclosure.

FIG. 3 illustrates a system 300 that facilitates employing a mobile device as an intermediary for adaptation of a vehicle amenity or vehicle performance based on a driver profile and other vehicle profile information in accordance with aspects of the subject disclosure. System 300 can include mobile device 310. Mobile device 310 can comprise adaptation component 320. Adaptation component 320 can determine vehicle adaptation information related to adapting a subsystem of a vehicle. Adaptation component 320 can be coupled to a vehicle subsystem control device (not illustrated) to facilitate adaptation of a vehicle subsystem. Coupling between mobile device 310 and a vehicle subsystem control device can be via a wired or wireless interface. As such, where adaptation component 320 of mobile device 310 determines vehicle adaptation information, this information can be made available to a vehicle, e.g., vehicle adaptation information to instant vehicle 360, to facilitate adaptation of a vehicle subsystem.

Adaptation component 320 can comprise amenity adjustment component 322 and performance mapping component 324. Nearly any vehicle subsystem can include an adaptive feature that can be subject to adaptation or control based on vehicle adaptation information, e.g., vehicle adaptation information to instant vehicle 360. Adaptation and control can be effected by a control device of the vehicle. Amenity adjustment component 322 can be coupled to a control device of the instant vehicle. Similarly, performance mapping component 324 can be coupled to a control device of the instant vehicle. Amenity adjustment component 322 can facilitate determining vehicle adaptation information related to adjustment of vehicular amenities such as seat position, mirror position, pedal position, climate settings, radio settings, etc. Performance mapping component 324 can facilitate determining vehicle adaption information related to adapting vehicle performance aspects, such as accelerator transfer functions, suspension adjustment, tire pressure adjustment, etc.

Mobile device 310 can receive driver profile information from server 330. Driver profile information can include nearly any type of information associated with a driver. Mobile device 310 can also receive vehicle profile information from instant vehicle 350. An instant vehicle can be a vehicle operated or occupied by a driver or passenger. As such, when a driver is proximate to the instant vehicle with mobile device 310, mobile device 310 can receive both driver profile information from server 330 and vehicle profile information from instant vehicle 350. In an aspect, driver profile information 330 and vehicle information 350 can be separate and distinct sets of information. A vehicle profile can comprise information specific to a particular vehicle in a manner similar to a driver profile storing information specific to a particular driver.

Mobile device 310 can further receive other vehicle profile information from server 340. Other vehicle profile information from server 340 can be similar to vehicle profile information for the instant vehicle but will typically be for other vehicles associated with the driver profile information from server 330. As an example, driver profile information from server 330 can comprise an identifier related to a vehicle other than the instant vehicle that is associated with the driver related to driver profile information from server 330. The identifier can be used to receive vehicle profile information from server 340 related to the identifier. This information can then be included in determining vehicle adaptation information to instant vehicle 360.

Adaptation component 320 of mobile device 310 can determine vehicle adaptation information to instant vehicle 360 based on driver profile information from server 330, other vehicle profile information from server 340, and vehicle profile information from instant vehicle 350. Vehicle adaptation information to instant vehicle 360 can comprise vehicle adaptation information determined by amenity adjustment component 322 and vehicle adaption information determined by performance mapping component 324. As such, other vehicle profile information from server 340 related to another vehicle associated with a driver can be included in determining vehicle adaptation information for adaptation of both an amenity of the instant vehicle or a performance aspect of the instant vehicle. This can allow a driver to more easily transition between a vehicle associated with the driver and an instant vehicle. Further, the driver profile or instant vehicle profile can be updated to reflect new information related, correspondingly, to the driver or the instant vehicle. In an aspect, this type of vehicle adaptive information can provide for improved safety and driver comfort as a driver uses different vehicles. Moreover, because adaptation can be facilitated by mobile device 310 as a MDI, the adaptation can be portable. Further, where the driver profile information, e.g., 330, and the other vehicle profile information, e.g., 340, are received from a server by mobile device 310, the adaptation can also be device independent, e.g., where a driver forgets their mobile phone, the adaptation can be effected by a tablet computer mobile device, etc.

Figure 4:
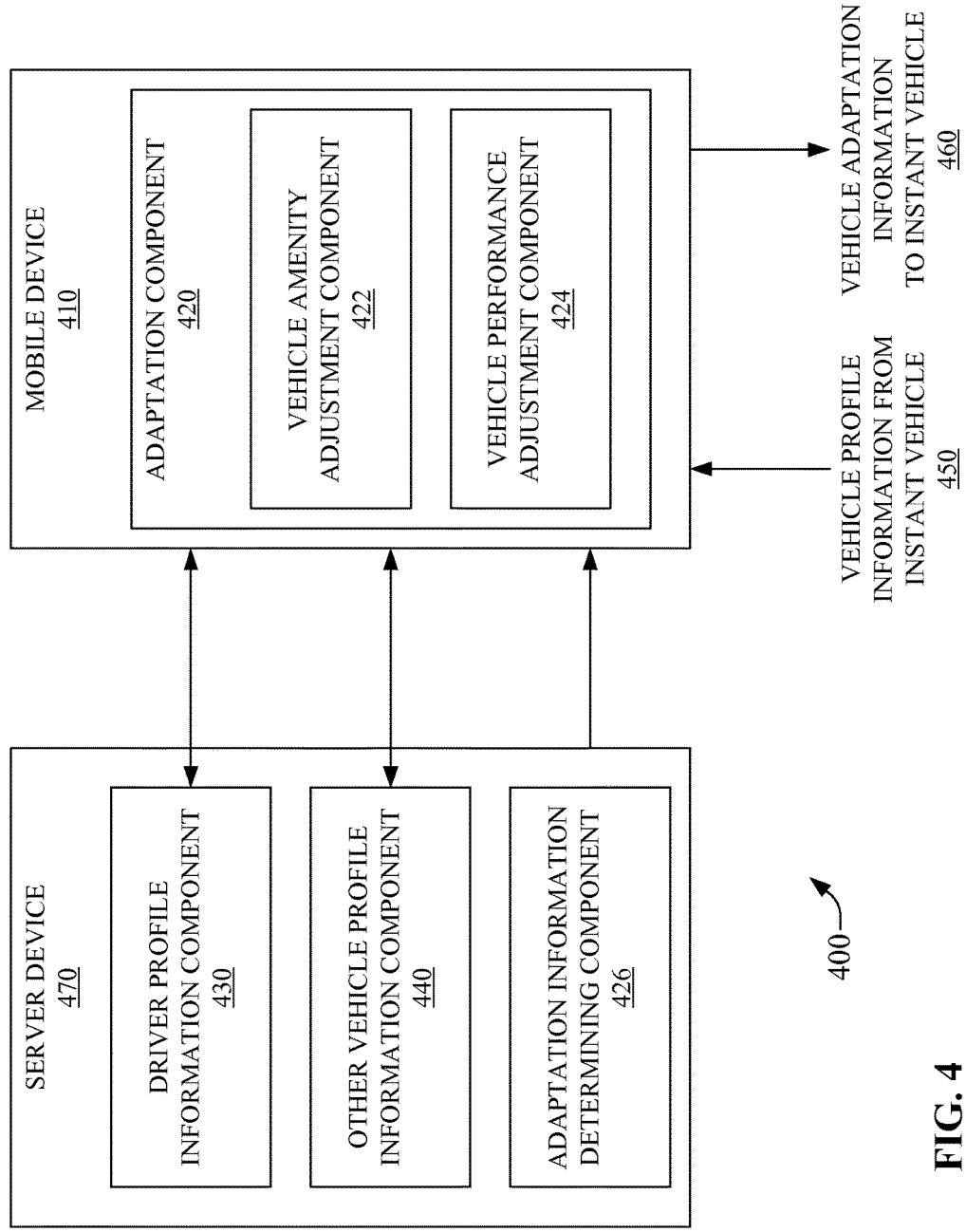
FIG. 4 illustrates a system that facilitates employing a mobile device as an intermediary for vehicle adaptation based on a driver profile and other vehicle profile information in accordance with aspects of the subject disclosure.

FIG. 4 illustrates a system 400 that facilitates employing a mobile device as an intermediary for vehicle adaptation based on a driver profile and other vehicle profile information in accordance with aspects of the subject disclosure.

System 400 can include mobile device 410. Mobile device 410 can comprise adaptation component 420. Adaptation component 420 can determine vehicle adaptation information related to adapting a subsystem of a vehicle. Adaptation component 420 can be coupled to a vehicle subsystem control device (not illustrated) to facilitate adaptation of a vehicle subsystem. Coupling between mobile device 410 and a vehicle subsystem control device can be via a wired or wireless interface. As such, where adaptation component 420 of mobile device 410 determines vehicle adaptation information, this information can be made available to a vehicle, e.g., vehicle adaptation information to instant vehicle 460, to facilitate adaptation of a vehicle subsystem.

System 400 can further comprise server device 470. Server device 470 can be remotely located from mobile device 410. In an aspect server device 470 can be a personal server device, a cloud server device, a wireless network operator device, etc. Mobile device can couple with server device 470 via a wired or wireless connection, though typically the connection will be wireless, e.g., a wireless communication link via a wireless network provider, a cellular communication link, a Wi-Fi communication link, a Bluetooth-type communication link, etc.

Server device 470 can comprise driver profile information component 430. Driver profile information component 430 can comprise driver profile information. As an example, driver profile information component 430 can be a data store housing driver profile information. As another example, driver profile information component 430 can receive driver profile information from a data store.

Server device 470 can further comprise other vehicle profile information component 440. Other vehicle profile information component 440 can comprise other vehicle profile information. As an example, other vehicle profile information component 440 can be a data store housing other vehicle profile information. As another example, other vehicle profile information component 440 can receive other vehicle profile information from a data store.

Moreover, server device 470 can comprise adaptation information determining component 426. Adaptation information determining component 426 can determine information related to determining vehicle adaptation information to instant vehicle 460. In an aspect, transfer of driver profile information and other vehicle profile information over wireless links to mobile device 410 from a server can be data intensive. By receiving driver profile information and other vehicle profile information at server 470 via driver profile information component 430 and other vehicle profile information component 440, adaptation information determination component 426 can determine information related to determining vehicle adaptation information to instant vehicle 460 at the server and can make that information available to mobile device 410. In some instances, this server-side determination can reduce the amount of data that can be transmitted in comparison to transmitting driver profile information and other vehicle profile information over wireless links. However, in other instances, especially where driver profile information and other vehicle profile information are compact, or where driver profile information and other vehicle profile information are pre-fetched, allowing the determination of vehicle adaptation information at mobile device 410 can be less data intensive than transmitting information related to determining vehicle adaptation information to instant vehicle 460 determined by adaptation information determining component 426. It will be appreciated that rules can be employed to select the less data intensive scheme to reduce consumption of typically limited wireless resources.

Adaptation component 420 can comprise amenity adjustment component 422 and performance mapping component 424. Amenity adjustment component 422 can be coupled to a control device of the instant vehicle. Similarly, performance mapping component 424 can be coupled to a control device of the instant vehicle. Amenity adjustment component 422 can facilitate determining vehicle adaptation information related to adjustment of vehicular amenities. Performance mapping component 424 can facilitate determining vehicle adaption information related to adapting vehicle performance aspects. Mobile device 410 can receive information from adaptation information determining component 426 of server device 470. Mobile device 410 can also receive vehicle profile information from instant vehicle 450. An instant vehicle can be a vehicle operated or occupied by a driver or passenger. As such, when a driver is proximate to the instant vehicle with mobile device 410, mobile device 410 can determine vehicle adaptation information to instant vehicle 460 based on vehicle profile information from instant vehicle 450 and information determined by adaptation information determining component 426. This can allow a driver to more easily transition between a vehicle associated with the driver and an instant vehicle. Further, the driver profile or instant vehicle profile can be updated via server device 470 to reflect new information related, correspondingly, to the driver or the instant vehicle. In an aspect, this type of vehicle adaptive information can provide for improved safety and driver comfort as a driver uses different vehicles. Moreover, because adaptation can be facilitated by mobile device 410 as a MDI, the adaptation can be portable. Further, where information determined by adaptation information determining component 426 is received from server device 470 by mobile device 410, the adaptation can also be device independent, e.g., where a driver forgets their mobile phone, the adaptation can be effected by a tablet computer mobile device, etc.

Figure 5:
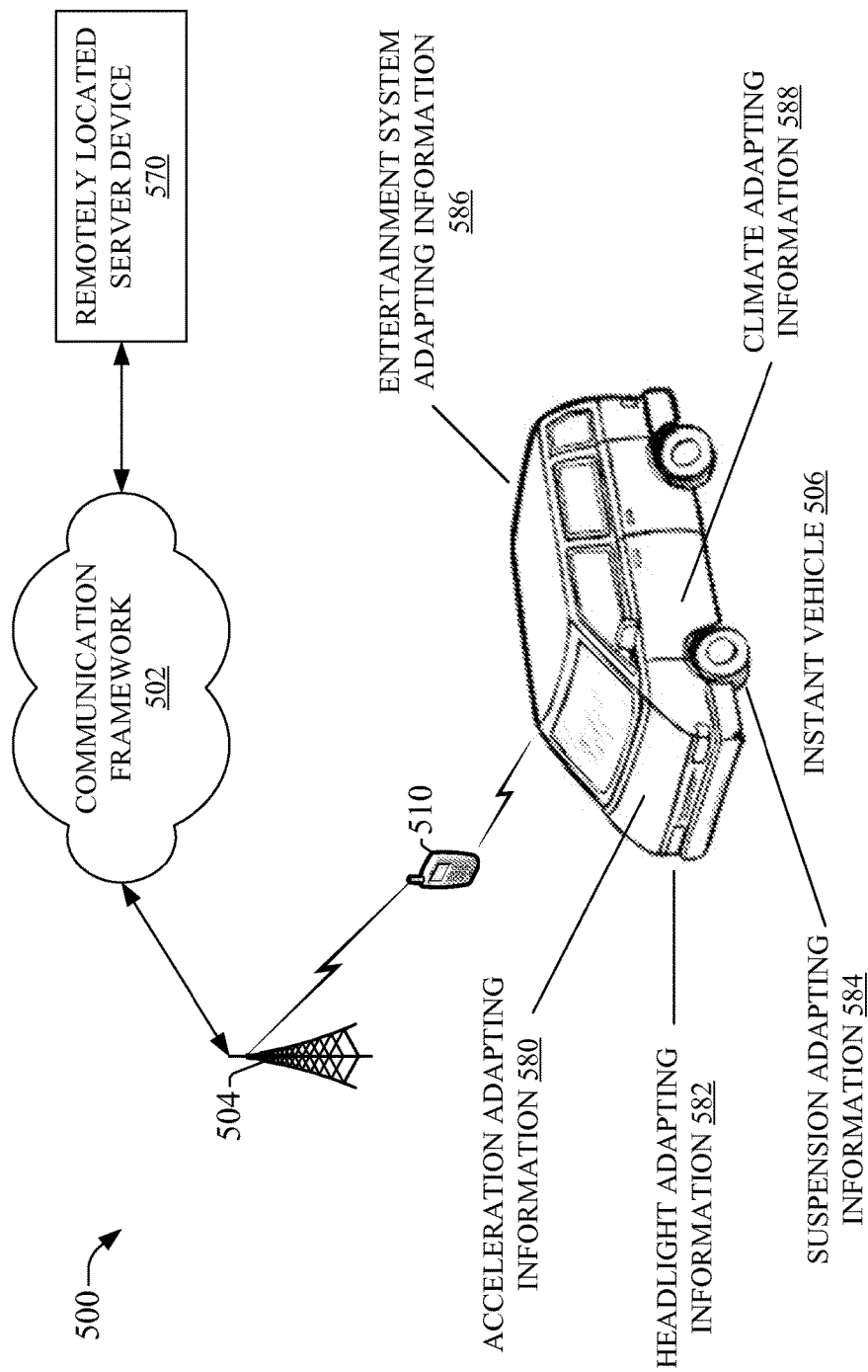
FIG. 5 illustrates an exemplary system that employs a mobile device as an intermediary for adaptation of various subsystems of a vehicle in accordance with aspects of the subject disclosure.

FIG. 5 illustrates exemplary system 500 that employs a mobile device as an intermediary for adaptation of various subsystems of a vehicle in accordance with aspects of the subject disclosure. System 500 can be a non-limiting example and can comprise mobile device 510. Mobile device 510 can be a smartphone, tablet computer, laptop computer, or any other type of mobile device, but is illustrated as a cellular phone in FIG. 5 for clarity and brevity. Mobile device 510 can be coupled to remotely located server device 570 by way of radio access network (RAN) 504 and communication framework 502. In an instance, RAN 504 can comprise wireless telecommunications network devices. Further, communication framework 502 can comprise internet devices such as routes, servers, etc.

Mobile device 510 can comprise an adaptation component (not illustrated) that can determine vehicle adaptation information that can be made accessible to instant vehicle 506. Vehicle adaptation information can comprise, for example, acceleration adapting information 580, headlight adapting information 582, suspension adapting information 584, entertainment system adapting information 586, or climate adapting information 588, among other types of vehicle adaptation information. Vehicle adaptation information can be employed by instant vehicle 506 to adapt corresponding vehicular subsystems. Adapting vehicular subsystems based on driver profile information via a MDI, e.g., mobile device 510, can allow a driver to more easily transition between a vehicle associated with the driver and an instant vehicle. Vehicle adaptive information can provide for improved safety and driver comfort. Moreover, because adaptation can be facilitated by a MDI, the adaptation can be portable. Further, the adaptation can also be device independent because other mobile devices (not illustrated) can act as a MDI and receive driver profile information and/or other vehicle profile information from remotely located server device 570 via communication framework 502 and RAN 504.

Figure 6:
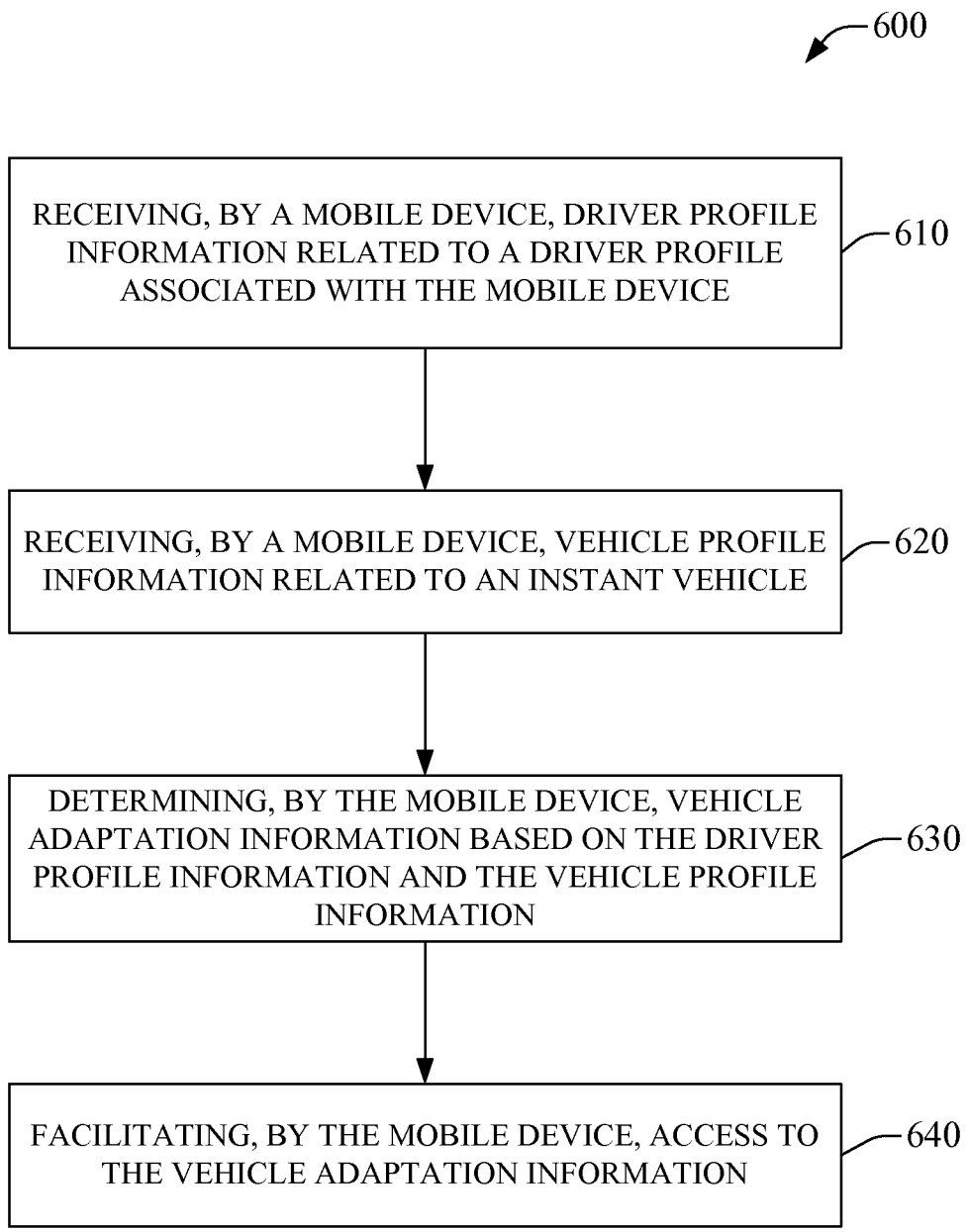
FIG. 6 illustrates a method facilitating employing a mobile device as an intermediary for vehicle adaptation based on a driver profile in accordance with aspects of the subject disclosure.
Figure 7:
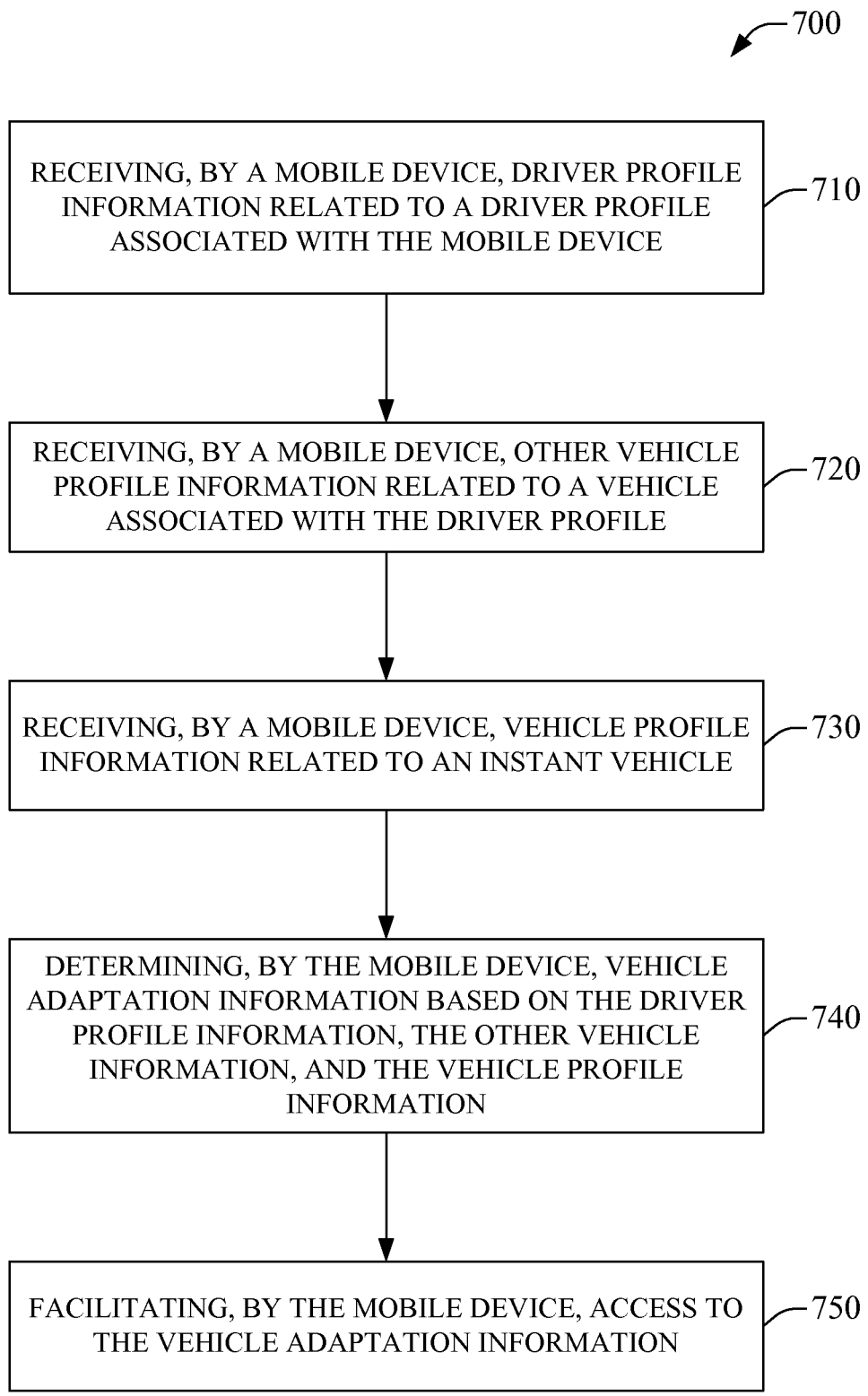
FIG. 7 illustrates a method facilitating employing a mobile device as an intermediary for vehicle adaptation based on a driver profile and other vehicle profile information in accordance with aspects of the subject disclosure.
Figure 8:
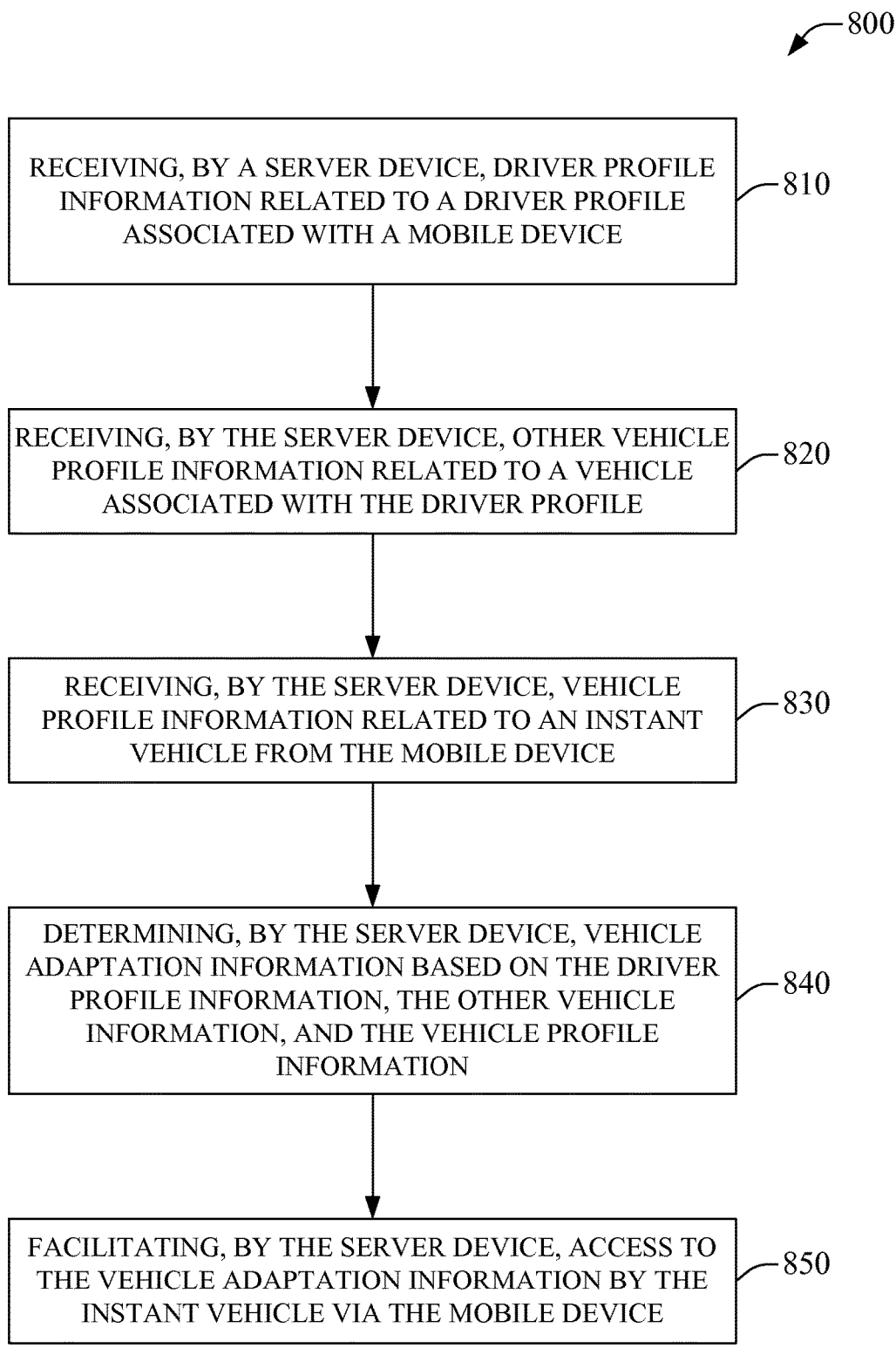
FIG. 8 illustrates a method facilitating employing a mobile device as an intermediary for vehicle adaptation based on a driver profile and other vehicle profile information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of method 600 facilitating employing a mobile device as an intermediary for vehicle adaptation based on a driver profile in accordance with aspects of the subject disclosure. At 610, method 600 can include reviving, by a mobile device, driver profile information related to a driver profile associated with the mobile device. The mobile device can be a smartphone, tablet computer, laptop computer, or any other type of mobile device. Driver profile information can include nearly any type of information associated with a driver. The term driver can refer to a vehicle operator or a passenger in a vehicle and is intended to be an inclusive, rather than an exclusive, term unless otherwise explicitly or inherently indicated, e.g., driver profile information can also be passenger profile information. Driver profile information can include, for example, height, weight, sex, medical information, corrective vision information, musical preference information, historical driving pattern or trip information, familial information, driving record information, driving habit information, historic use information, identifiers for vehicles associated with a driver, or nearly any other type of information associated with a driver.

At 620, method 600 can comprise the mobile device receiving vehicle profile information related to an instant vehicle. Vehicle profile information can comprise information specific to a particular vehicle in a manner similar to driver profile information storing information specific to a particular driver. As such, vehicle profile information can comprise vehicle identification information, such as a vehicle identification number (VIN), a license plate number, etc. Further, vehicle profile information can include vehicle make, vehicle model, vehicle service history, vehicle options, odometer information, vehicle geometry information, relevant service bulletin or recall information, historical use information, etc. Vehicle geometry information can include, for example, wheelbase, turning radius, length, width, headlight angle, pedal positions, seat positions, legroom information, headroom information, blindspot geometry, etc. Historical use information can comprise, for example, fuel economy, lateral acceleration information as a function of speed, braking performance information, acceleration transfer function information, vehicle weight, environmental or weather information, entertainment or radio information, cabin climate selection information, mirror position information, car seat or booster seat usage information, etc. Vehicle profile information can be associated with a plurality of driver profiles. This can allow vehicle adaptation to be based on driver profile information and vehicle information. An instant vehicle can be a vehicle operated or occupied by a driver or passenger.

At 630, method 600 can include determining, by the mobile device, vehicle adaptation information based on the driver profile information and the vehicle profile information. Vehicle adaptation information can be related to adapting a subsystem of a vehicle. Nearly any vehicle subsystem can include adaptive features, e.g., a vehicle engine can comprise an acceleration transfer function that determines vehicular acceleration in response to actuation of a gas pedal, a vehicle suspension system can be adjustable, the projection angel of a vehicle's headlights can be adjusted, seat positions or lumbar support can be adjustable, radio stations can be updateable, power mirrors can be adjusted automatically, climate control systems can be programmable, tire inflation can be adjustable, etc. In an aspect, nearly any vehicle subsystem can be subject to adaptation or control. This adaptation and control can be effected by a control device, e.g., a dedicated controller device, a central vehicle computer system, etc.

At 640 of method 600, the mobile device can facilitate access to the vehicle adaption information. At this point method 600 can end. In an embodiment, a control device of a vehicle can access the vehicle adaptation information. Access can be via a wired or wireless interface, e.g., a cable, Bluetooth-type coupling, Zigbee-type coupling, etc. As such, vehicle adaptation information can be determined and this information can be made available to an instant vehicle to facilitate adaptation of a vehicle subsystem. In an aspect, vehicle adaption information can provide for improved safety and driver comfort as a driver uses different vehicles. Moreover, because adaptation can be facilitated by the mobile device as a MDI, the adaptation can be portable. Further, where vehicle adaptation information is determined from driver profile information received from a remote data store, e.g., at 610 the receiving is from a remotely located data store, the adaptation can also be device independent, e.g., where a driver forgets their mobile phone, the adaptation can be effected by a tablet computer mobile device, etc.

FIG. 7 illustrates a method 700 that facilitates employing a mobile device as an intermediary for vehicle adaptation based on a driver profile and other vehicle profile information in accordance with aspects of the subject disclosure. At 710, method 700 can include reviving, by a mobile device, driver profile information related to a driver profile associated with the mobile device. The mobile device can be a smartphone, tablet computer, laptop computer, or any other type of mobile device. Driver profile information can include nearly any type of information associated with a driver.

At 720 of method 700, a mobile device can receive other vehicle profile information related to a vehicle associated with the driver profile. Other vehicle profile information can comprise information specific to a particular vehicle. As such, other vehicle profile information can comprise vehicle identification information, such as a vehicle identification number (VIN), a license plate number, etc. Further, other vehicle profile information can include vehicle make, vehicle model, vehicle service history, vehicle options, odometer information, vehicle geometry information, relevant service bulletin or recall information, historical use information, etc. Vehicle geometry information can include, for example, wheelbase, turning radius, length, width, headlight angle, pedal positions, seat positions, legroom information, headroom information, blindspot geometry, etc. Historical use information can comprise, for example, fuel economy, lateral acceleration information as a function of speed, braking performance information, acceleration transfer function information, vehicle weight, environmental or weather information, entertainment or radio information, cabin climate selection information, mirror position information, car seat or booster seat usage information, etc. Other vehicle profile information can be associated with a plurality of driver profiles. This can allow vehicle adaptation to be based on driver profile information and other vehicle information. Other vehicle profile information can be similar to vehicle profile information for an instant vehicle but will typically be for other vehicles associated with the driver profile information from 710. As an example, driver profile information can comprise an identifier related to a vehicle other than the instant vehicle that is associated with the driver related to driver profile information. The identifier can be used to receive other vehicle profile information related to the identifier. This information can then be included in determining vehicle adaptation information, e.g., at 740.

At 730, method 700 can include receiving, by the mobile device, vehicle profile information related to an instant vehicle. An instant vehicle can be a vehicle operated or occupied by a driver or passenger. Vehicle profile information can be similar to other vehicle profile information but will typically be for an instant vehicle.

At 740, method 700 can include determining, by the mobile device, vehicle adaptation information based on the driver profile information, other vehicle profile information, and vehicle profile information for the instant vehicle. Vehicle adaptation information can be related to adapting a subsystem of a vehicle. In an aspect, nearly any vehicle subsystem can be subject to adaptation or control. This adaptation and control can be effected by a control device of the instant vehicle.

At 750 of method 700, the mobile device can facilitate access to the vehicle adaption information. At this point method 700 can end. In an embodiment, a control device of the vehicle can access the vehicle adaptation information. Access can be via a wired or wireless interface. Vehicle adaptation information can be determined and this information can be made available to an instant vehicle to facilitate adaptation of a vehicle subsystem. Vehicle adaption information can provide for improved safety and driver comfort as a driver uses different vehicles, can be portable, and can also be device independent.

FIG. 8 illustrates a method 800 that facilitates employing a mobile device as an intermediary for vehicle adaptation based on a driver profile and other vehicle profile information in accordance with aspects of the subject disclosure. At 810, method 800 can include receiving, by a server device, driver profile information related to a driver profile associated with a mobile device. A server device can be remotely located from a mobile device. In an aspect, the server device can be a personal server device, a cloud server device, a wireless network operator device, etc. A mobile device can couple, e.g., at 830, with the server device via a wired or wireless connection, though typically the connection will be wireless, e.g., a wireless communication link via a wireless network provider, a cellular communication link, a Wi-Fi communication link, a Bluetooth-type communication link, etc.

At 820, method 800 can include the server device receiving other vehicle profile information related to a vehicle associated with the driver profile. Other vehicle profile information can comprise information specific to a particular vehicle. As such, other vehicle profile information can comprise vehicle identification information. Further, other vehicle profile information can include make, model, service history, options, odometer information, geometry information, relevant service bulletin or recall information, historical use information, etc. Other vehicle profile information can be associated with a plurality of driver profiles.

At 830, method 800 can comprise receiving, by the server device, vehicle profile information related to an instant vehicle from the mobile device. An instant vehicle can be a vehicle operated or occupied by a driver or passenger associated with driver profile information from 810. Vehicle profile information can be similar to other vehicle profile information but will typically be for an instant vehicle.

At 840, method 800 can include, determining by the server device, vehicle adaptation information based on the driver profile information, other vehicle profile information, and vehicle profile information for the instant vehicle. Vehicle adaptation information can be related to adapting a subsystem of a vehicle. In an aspect, nearly any vehicle subsystem can be subject to adaptation or control. This adaptation and control can be effected by a control device of the instant vehicle.

At 850, method 800 can include the server device facilitating access to the vehicle adaption information via the mobile device. At this point method 800 can end. In an embodiment, a control device of the vehicle can access the vehicle adaptation information from the server device via the mobile device acting as a MDI. Access between the MDI and vehicle, or between the MDI and the server device, can be via a wired or wireless interface. Vehicle adaptation information can be determined at the server device and this information can be made available via the mobile device MDI to an instant vehicle to facilitate adaptation of a vehicle subsystem. Vehicle adaption information can provide for improved safety and driver comfort as a driver uses different vehicles, can be portable, and can also be device independent.

Figure 9:
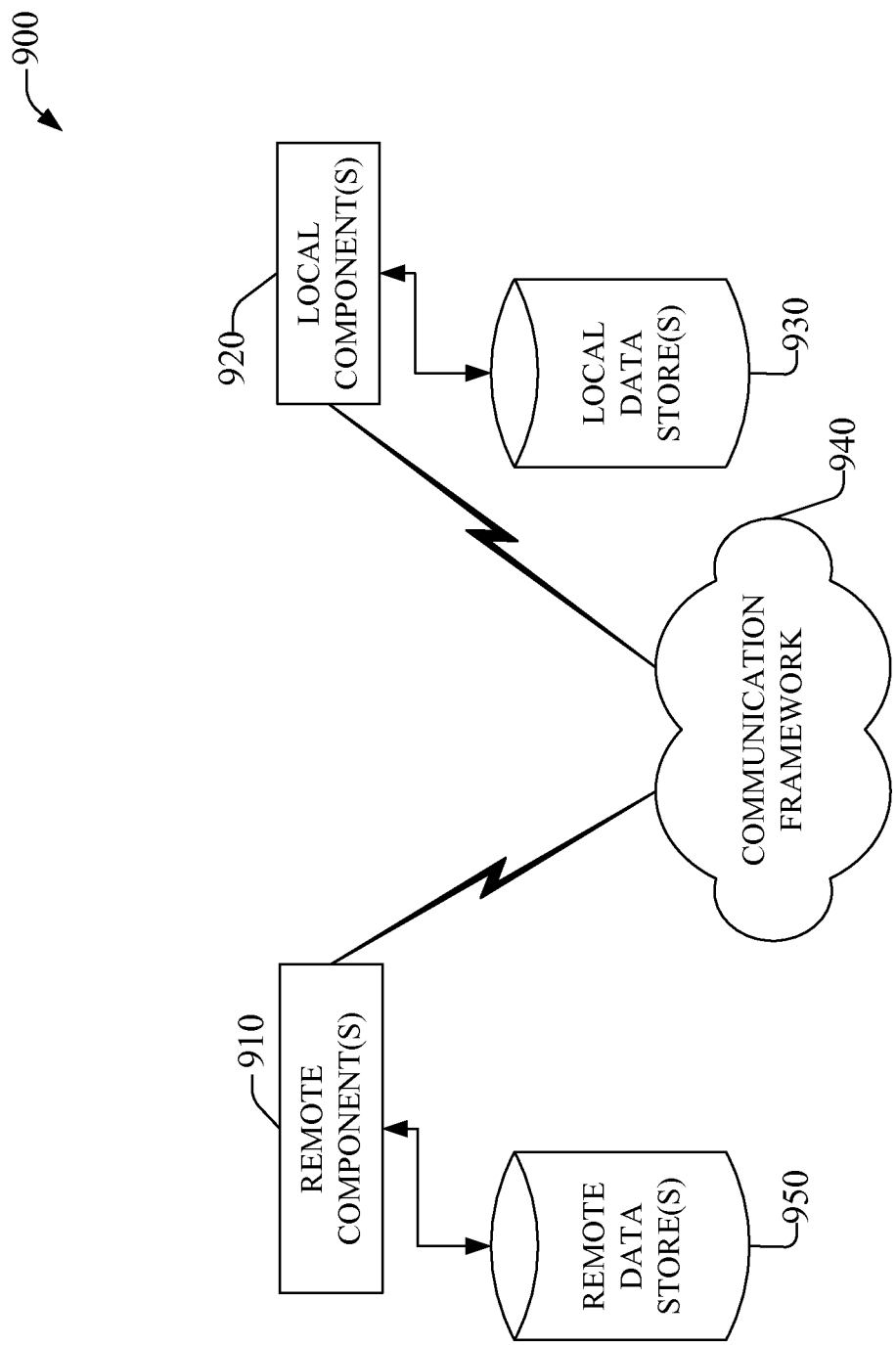
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a device of a wireless carrier network, e.g., a RAN. As another example, remote component(s) 910 can be a server associated with a cloud computing provider device.

The system 900 also includes one or more local component(s) 920. The local component(s) 920 can be hardware and/or software (e.g., threads, processes, computing devices). In some embodiments, local component(s) 920 can include mobile device 110, 210, 310, 410, 510, etc. As an example, local component(s) 920 can be a MDI comprising a smartphone.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. As an example, driver profile information, other vehicle profile information, instant vehicle profile information, etc., can be communicated over a packet-switched or circuit-switched channels between a server device, e.g., remote component 910, and a mobile device, e.g., a local component 920, over an air interface, such as on a packet-switched or circuit-switched downlink channel. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a driver profile information store, a other vehicle profile information store, etc., that can be employed to store information, such as a driver profile or other vehicle profile, on the remote component(s) 910 side of communication framework 940. Similarly, local component(s) 920 can be operably connected to one or more local data store(s) 930, that can be employed to store information, such as received driver profile information or received other vehicle profile information, on the to the local component(s) 920 side of communication framework 940.

Figure 10:
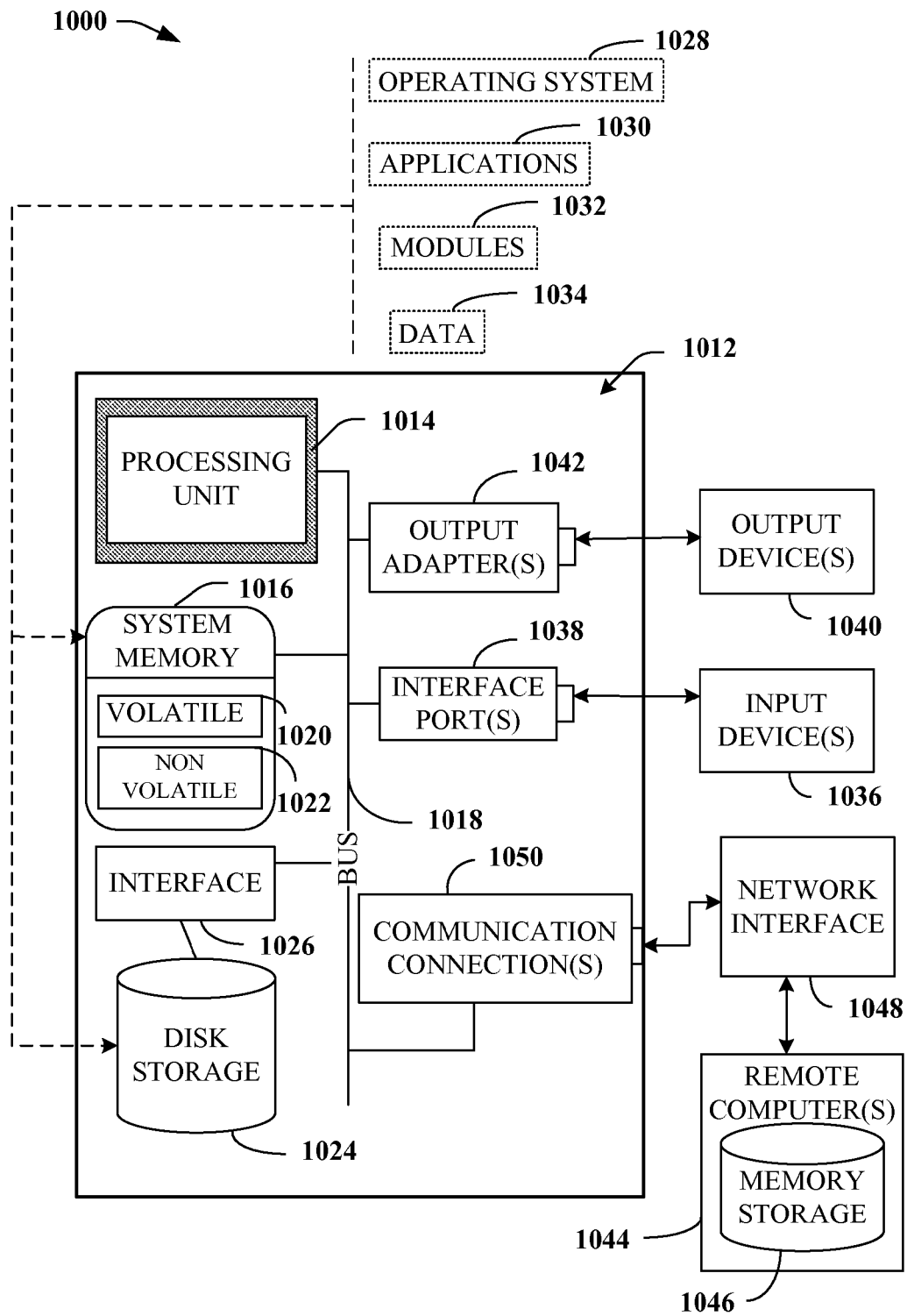
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of mobile device 110, 210, 310, 410, 510, etc., server device 470, 570, etc., or employing method 600, 700, or 800, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can be embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc; femto-cell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A mobile device, comprising:
 a processor; and
 a memory that stores executable instructions that, when executed by the processor, facilitate performance of operations, comprising:
  receiving driver profile information associated with a driver profile that is associated with the mobile device, wherein the driver profile information comprises a selectable characteristic for an adjustable aspect of a first vehicle model;

receiving vehicle profile information related to a first vehicle, wherein the vehicle profile information comprises model identification information corresponding to a model of the first vehicle;

in response to determining that the first vehicle model is a same model as the model of the first vehicle, determining vehicle adaptation information related to adapting an aspect of the first vehicle, corresponding to the adjustable aspect of the first vehicle model, based on the selectable characteristic of the driver profile information and the vehicle profile information; and facilitating access to the vehicle adaptation information for a device of the first vehicle to enable adaptation of the aspect of the first vehicle.

2. The mobile device of claim 1, wherein the device of the first vehicle is a first device, and wherein the receiving the driver profile information comprises receiving the driver profile information from a second device located remotely from the mobile device.

3. The mobile device of claim 2, wherein the second device is a server device that communicates with the mobile device via a wireless telecommunications network device, and wherein the first device of the first vehicle communicates with the mobile device via a wireless network interface device.

4. The mobile device of claim 2, wherein the second device is a radio access network device of a wireless telecommunications network.

5. The mobile device of claim 1, wherein the vehicle information is first vehicle information, and wherein the operations further comprise receiving second vehicle profile information related to a second vehicle associated with the driver profile, and wherein the determining is further based on the second vehicle profile information.

6. The mobile device of claim 5, wherein the device of the first vehicle is a first device, and wherein the second vehicle profile information is received from a second device located remotely from the mobile device.

7. The mobile device of claim 1, wherein the vehicle adaptation information relates to adapting a performance aspect of the first vehicle.

8. The mobile device of claim 7, wherein the selectable characteristic relates to an acceleration curve of the first vehicle model and wherein the performance aspect comprises an acceleration aspect of the first vehicle.

9. The mobile device of claim 7, wherein the selectable characteristic relates to an suspension configuration of the first vehicle model and wherein the performance aspect comprises a suspension aspect of the first vehicle.

10. The mobile device of claim 1, wherein the selectable characteristic relates to a line of sight for an operator position of the first vehicle model and wherein the vehicle adaptation information relates to adapting a seat position of the first vehicle corresponding the line of sight.

11. A method, comprising:

receiving, by a mobile device comprising a processor, driver profile information associated with the mobile device from a server device located remotely from the mobile device, wherein the driver profile information comprises a selectable value for a feature of a vehicle model;

receiving, by the mobile device, vehicle profile information related to a first vehicle, wherein the vehicle profile information comprises a model of the first vehicle;

in response to determining that the model of the first vehicle corresponds to the vehicle model, determining, by the mobile device, vehicle adaptation information related to adapting an aspect of the first vehicle and based on the driver profile information and the vehicle profile information; and facilitating, by the mobile device, access to the vehicle adaptation information for a first device of the first vehicle to initiate adaptation of the aspect of the first vehicle.

12. The method of claim 11, wherein the receiving the vehicle profile information comprises receiving the vehicle profile information from a wireless telecommunications network device.

13. The method of claim 11, wherein the vehicle profile information is first vehicle profile information, and further comprising receiving, by the mobile device, second vehicle profile information related to a second vehicle associated with the driver profile information and wherein the determining is further based on the second vehicle profile information.

14. The method of claim 11, wherein the determining the adaptation information relates to adapting a performance aspect of the first vehicle.

15. The method of claim 11, wherein the determining the adaptation information relates to adapting an acceleration transfer function of the first vehicle.

16. The method of claim 11, wherein the determining the adaptation information relates to adapting a suspension aspect of the first vehicle.

17. The method of claim 11, wherein the mobile device is a mobile phone device coupled to the server device via a wireless telecommunications network device.

18. A server device, comprising:

a processor; and a memory that stores executable instructions that, when executed by the processor, facilitate performance of operations, comprising:

receiving driver profile information associated with a driver profile that is associated with a mobile device;

receiving first vehicle profile information related to a first vehicle via the mobile device;

receiving second vehicle profile information related to a second vehicle associated with the driver profile;

based on the driver profile information, the first vehicle profile information, and the second vehicle profile information, determining vehicle adaptation information related to adapting an aspect of the first vehicle; and in response to determining, based on the first vehicle profile information and driver profile information, that a model of the first vehicle corresponds to a selectable setting of the driver profile for the model of the first vehicle, enabling access, via the mobile device, to the vehicle adaptation information for a device of the first vehicle to facilitate adaptation of the aspect of the first vehicle.

19. The server device of claim 18, wherein the vehicle adaptation information relates to adapting a performance aspect of the first vehicle.

20. The server device of claim 19, wherein the performance aspect comprises a vehicle acceleration response aspect of the first vehicle.

* * * * *